Feb. 21, 1950     W. VUTZ ET AL     2,498,319
BALER MECHANISM
Filed July 17, 1944     3 Sheets-Sheet 1
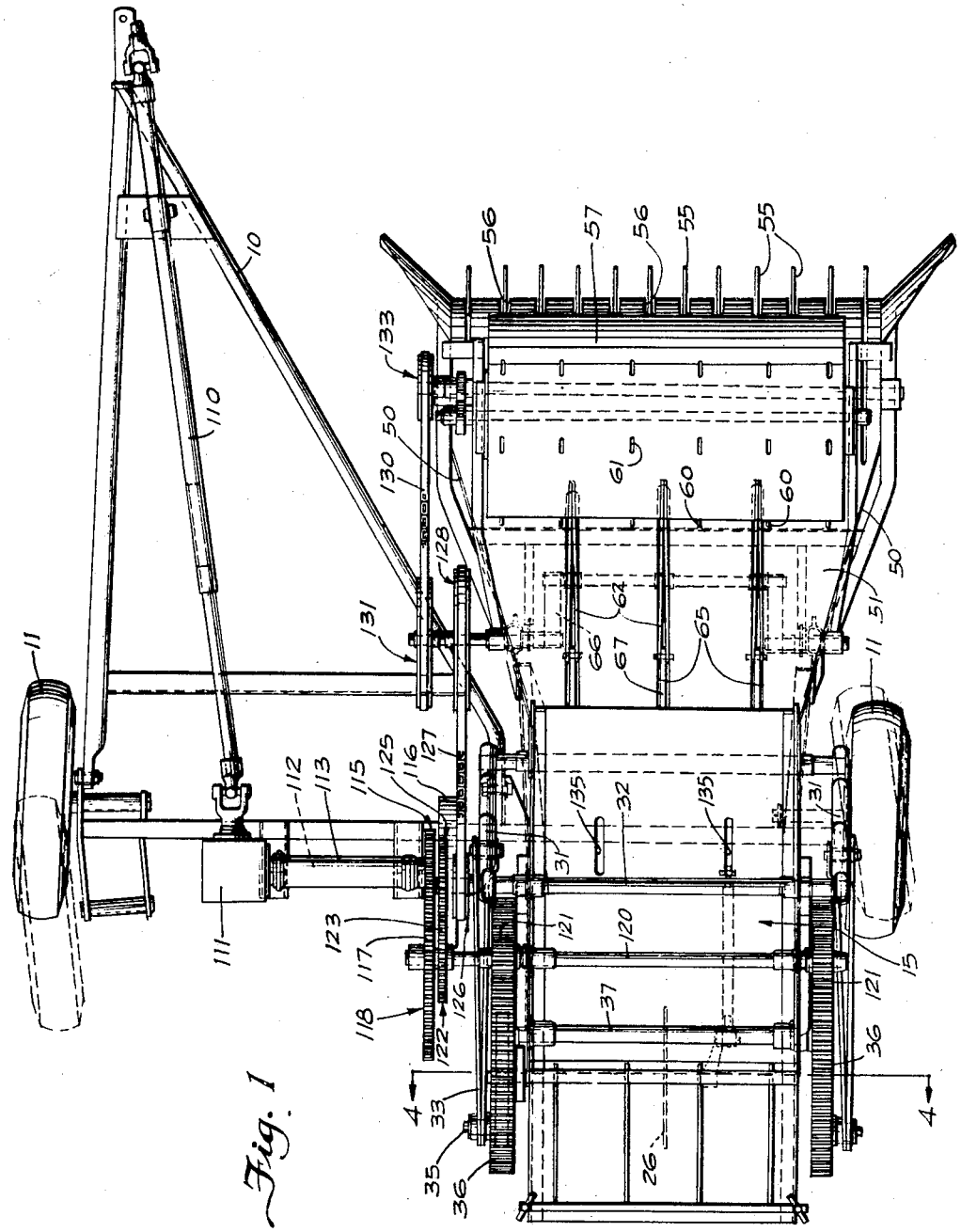
INVENTORS.
Wilhelm Vutz
BY Leo H. Bruggeman
Mann, Brown & Cox
ATTYS.

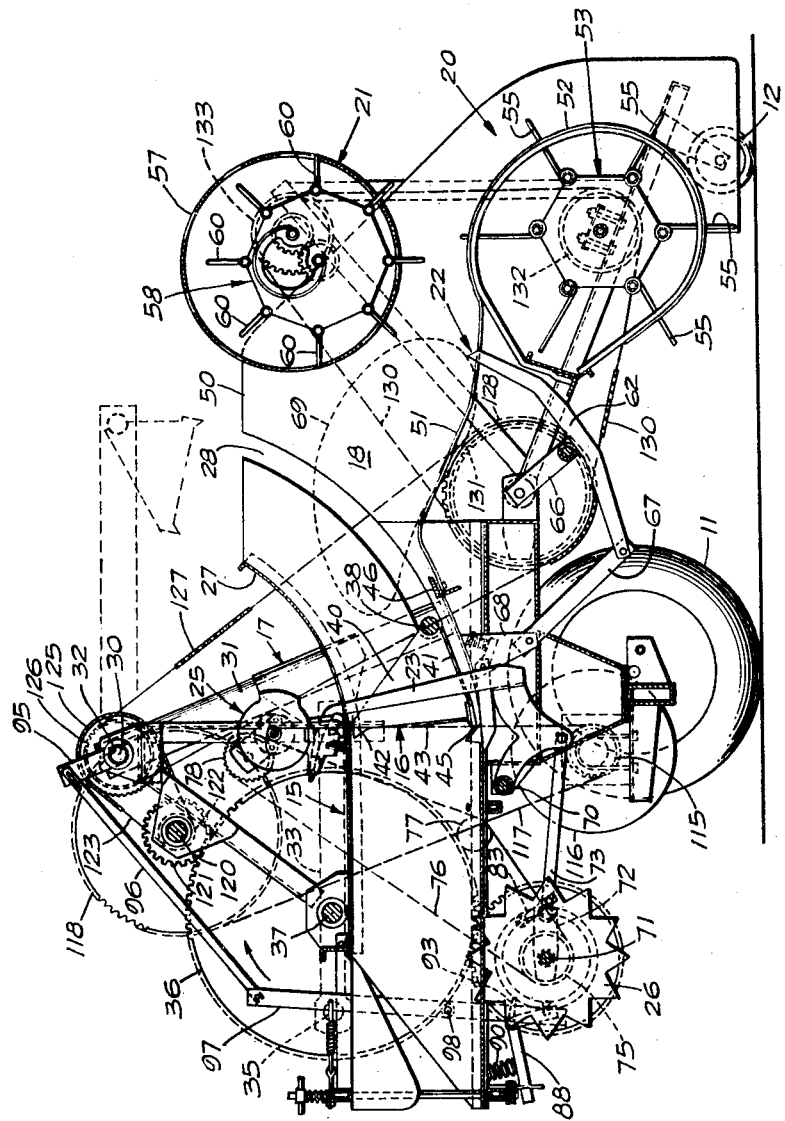

Feb. 21, 1950 — W. VUTZ ET AL — 2,498,319
BALER MECHANISM
Filed July 17, 1944 — 3 Sheets-Sheet 3
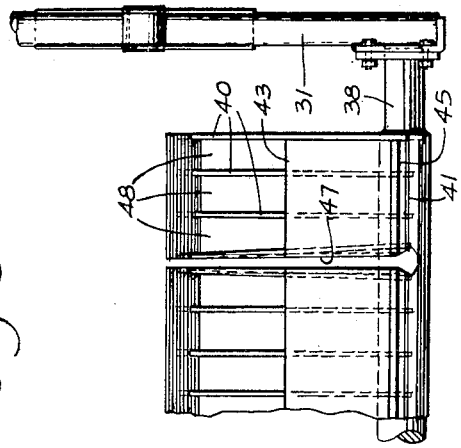
Fig. 6
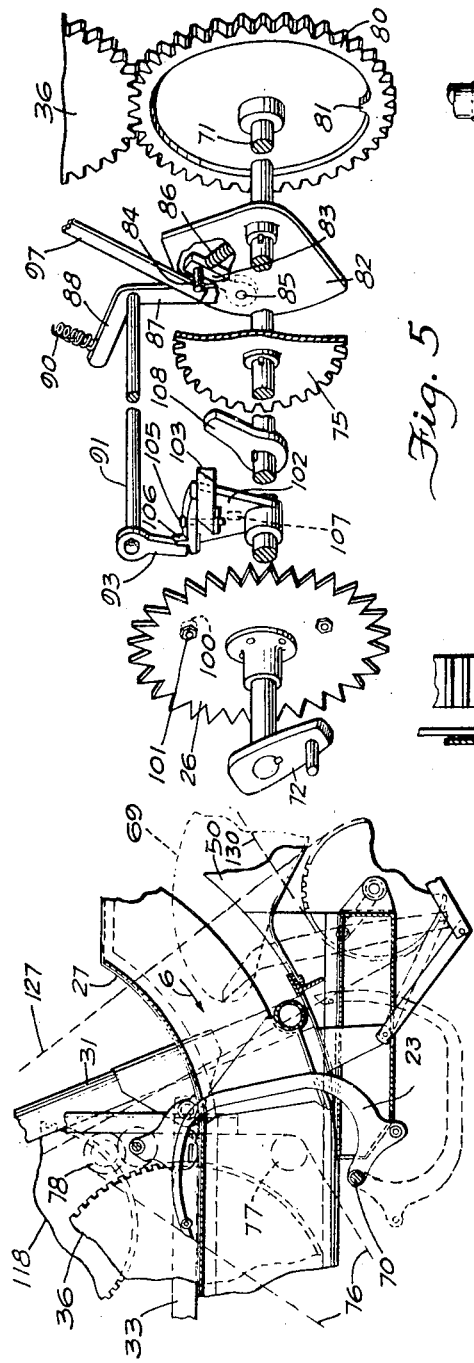
Fig. 5
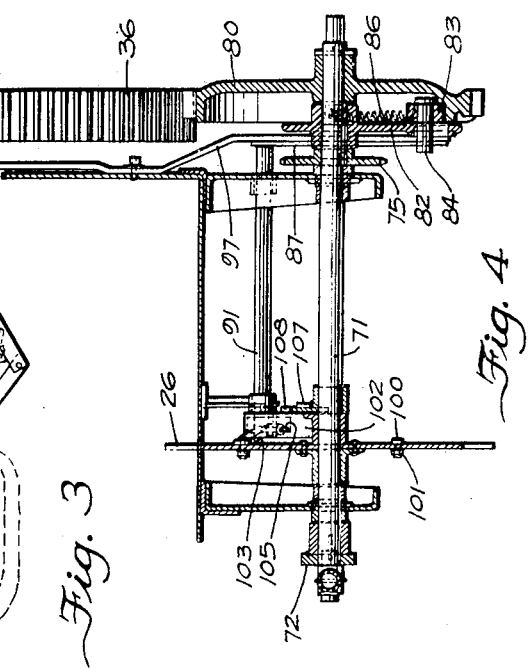
Fig. 4
Fig. 3
INVENTORS.
Wilhelm Vutz
Leo H. Bruggeman
BY
Mann, Brown & Co.
ATTYS.

Patented Feb. 21, 1950

2,498,319

UNITED STATES PATENT OFFICE 2,498,319

BALER MECHANISM

Wilhelm Vutz and Leo H. Bruggeman, Coldwater, Ohio, assignors, by mesne assignments, to Avco Manufacturing Corporation, a corporation of Delaware Application July 17, 1944, Serial No. 545,295

11 Claims. (Cl. 100—20)

Our invention relates to apparatus for baling hay and the like and is directed to the form of baler disclosed in the co-pending application, Serial No. 541,735, filed by Wilhelm Vutz. While various features of the invention are applicable to balers in general, the invention is being initially embodied with special advantages in a windrow pick-up baler. For the purpose of the present disclosure, we elect to describe a pick-up baler of the swinging plunger type, such disclosure affording adequate guidance for those skilled in the art having occasion to apply underlying principles to other specific types of balers.

The general object of the present invention is to provide a novel automatic tying mechanism that does not require a pause in the operation of the baling plunger or any special expedient to keep the material under pressure until the tying operation is completed. In general, this object is obtained by providing a clutch for the tying mechanism that is controlled by a metering means through a trip arrangement, automatic means being provided to reset the arrangement. In the preferred practice of our invention, the trip mechanism is actuated through the medium of an overrunning clutch that is effective at spaced points in the operation of the metering means, these points being adjustable in spacing for producing bales of various sizes as may be desired.

The above and other objects of our invention will be apparent from the following description taken with the accompanying drawings.

In the drawings, which show a preferred form of the invention by way of suggestion and illustration only, Fig. 1 is a plan view of the apparatus;

Fig. 2 is a side elevation of the apparatus with parts broken away;

Fig. 3 is a side elevation with parts broken away, the view showing certain mechanism in alternative position;

Fig. 4 is a transverse section taken as indicated by the line 4—4 of Fig. 1, certain parts being omitted for simplicity;

Fig. 5 is an exploded view in perspective of means for automatic actuation of the bale-tying mechanism; and Fig. 6 is a fragmentary view of the swinging plunger, viewed as indicated by the arrow 6 in Fig. 3.

General arrangement

The baler shown in the drawings is provided with a hitch 10 for attachment to a tractor or other draft means and is supported by a pair of side wheels 11 and may have a pair of front wheels 12 or other weight gauging means. The principal parts of the general combination include a baling chamber, generally designated 15, a plunger head, generally designated 16, mounted on a pivoted reciprocating support means 17, an accumulation space or receptacle 18 in front of the baling chamber, a pick-up means 20 adapted to cooperate with an upper conveyor means 21 to deliver material to the accumulation receptacle, a periodically effective conveyor means 22 to move material from the accumulation receptacle into the path of the plunger head 16 in timed relation to the plunger head operation, a bale-tying mechanism including a pair of needles 23 mounted below the baling chamber, a pair of knotter means 25 mounted above the baling chamber, and a metering means, generally designated 26, for controlling the operation of the needles and the knotter means in response to movement of compressed material in the baling chamber.

The arrangement for forming bales

The baling chamber 15, which is of rectangular cross section configuration, is open at both ends so that material may be forced in at the front end by the plunger head 16 and may escape in the form of finished bales at the rear end. The side and top walls of the baling chamber form a curved receiving end 27 with curved slots 28 in the sides, the receiving end and the two slots having in common an axis of curvature located at 30.

The plunger head 16 which is dimensioned to fit into the curved receiving end 27 of the baling chamber is mounted on the swinging support 17 by side connections positioned to extend through the two curved slots 28. In the preferred practice of our invention, the support means 17 comprises a pair of arms 31, one on each side of the baling chamber 15, the two arms being rotatably mounted on an upper cross shaft 32 extending along the axis 30.

For actuation of the plunger head 16 a connecting rod 33 may connect each of the two arms with a crank pin 35 on a large crank gear 36, the two gears 36 on the opposite sides of the machine being keyed to a common cross shaft 37.

As best shown in Figs. 2 and 6, the two arms 31 may be interconnected at their lower ends by a cross member 38 positioned to extend through the two curved slots 28, the cross member being a structural part of the plunger head 16. The plunger head includes a plurality of spaced vertical longitudinal plates 40 and a bottom plate 41, all of which are directly mounted on the cross member 38. The structure of the plunger head also includes an upper transverse nosepiece 42, a transverse pressure plate 43 and a transverse cutting blade 45 positioned to cooperate with a stationary cutting blade 46 on the baling chamber.

The material of the plunger head 16 is cut away to form suitable slots 47 to provide clearance for the two previously mentioned needles 23 when the plunger head is in the region of the needle movement.

An important feature of the described plunger head is the manner in which it permits the escape of displaced air and yet is effective in compressing material into the baling chamber. In the absence of any special provisions for air release, the displaced air which is heavily ladened with dust and fine particles will escape in numerous directions around the edge of the advancing plunger head, the result being unnecessary dispersal of dust and excessive deposition of dust on such working parts as the knotter mechanism above the baling chamber. As best shown in Fig. 6, the spaced longitudinal plates 40 form numerous ample air vent passages 48 above the pressure plate 43, these air vent passages directing the dust-laden air away from all adjacent mechanism.

Material feeding means

The side walls of the curved receiving end of the baling chamber 15 are continued as side walls 50 for the accumulation receptacle 18. The bottom of the accumulation receptacle is part of a material-supporting wall 51 that extends forward from the baling chamber 15 and is curved to form a forward pick-up nose 52 of curved configuration. Mounted inside the nose 52 is a rotary pick-up assembly 53 having radial tines or conveyor projections 55 for extension through longitudinal slots 56 in the pick-up nose 52, the nose and the rotary assembly comprising the pick-up means 20. The pick-up nose 52 is curved eccentrically relative to the axis of the rotary pick-up assembly so that the tines 55 extend downward and forward through the pick-up nose to engage and lift the material to be baled but retreat to within the nose as they move rearwardly from their uppermost positions.

The upper conveyor means 21 comprises a rotary cylinder 57 inside of which is mounted a rotary assembly 58 eccentrically thereto. Extending radially outwardly from the rotary assembly 58 is a plurality of conveyor projections or prongs 60 adapted to retractably extend through the corresponding short peripheral slots 61 in the cylinder 57, the eccentric relationship being such that the prongs are extended to the maximum during the lower halves of their rotary paths and are completely retracted inside the cylinder 57 during the upper halves of their circular paths.

It will be noted that the upper conveyor means 21 is set slightly rearwardly of the pick-up means 20 so that the upper conveyor means in effect receives the material released by the pick-up means and propels the material rearward towards the center of the accumulation receptacle 18. In effect, the upper conveyor means 21 serves as a wall of the accumulation receptacle 18 and cooperates with the pick-up means 20 to form the entrance to the receiving receptacle.

The conveyor means 22 for periodically shifting material from the accumulation receptacle 18 towards the baling chamber 15 comprises three fingers 62 and mechanism for causing the three fingers to move in a suitable conveying path involving extension and retraction of the fingers through three slots 65 in the wall 51 at the bottom of the accumulation receptacle. In the construction shown, the three fingers 62 are fulcrumed at intermediate points thereof on a crank provided by a crank shaft 66 and at their inner ends are connected by individual links 67 to fixed brackets 68. The combined effect of moving the fulcrums of the fingers in the circular orbits and of flexibily anchoring the inner ends of the fingers by the links 67 is to cause the finger tips to move in the manner indicated by the dotted line 69 in Fig. 2. Thus the fingers move upward through the slots 65 in the material-supporting wall 51 to engage the material released by the upper conveyor means 21 and then the fingers move forward into the path of the plunger head 16 at the receiving end of the baling chamber, whereupon the fingers drop below the material-supporting wall 51 to return to their forward positions for again engaging the material.

The arrangement for tying bales

The two needles 23, which are of the curved configuration shown, are keyed to a common shaft 70 for movement in unison. The knotter means 25 with which the two needles cooperate may be any of the well-known devices that are commercially available and need not be described. The bale-tying mechanism includes a cross shaft 71 to serve as common actuating means for the two needles and the knotter. For this purpose a crank 72 at one end of the cross shaft 71 is connected by a link 73 with one of the two needles 23 and a sprocket 75 keyed to the same shaft actuates a sprocket chain 76 for driving the knotter means 25. The sprocket chain 76 passes around an idler sprocket 77 and around an upper driven sprocket 78 that is operatively connected with the knotter 25 in a suitable manner.

The means for controlling the intermittent operation of the two needles and the knotter is best shown in Figs. 4 and 5. Freely rotatable on the cross shaft 71 is a driven rotary clutch member 80 in the form of a gear meshing with one of the previously mentioned gears 36 to be continuously actuated thereby. The driven clutch member 80 is half the diameter of the gear 36, and, since the gear 36 carries one of the crank pins 35 for actuating the plunger head 16, the clutch member 80 will make one complete rotation during half a cycle of plunger head operation. It is contemplated that the plunger head 16 will reach its lowermost position of maximum baling pressure at approximately the middle of the tying cycle represented by rotation of the clutch member 80, suitable means being provided to assure such synchronization as will be explained.

The driven clutch member 80 is hollowed out and formed with an interior clutch shoulder 81 of sloping configuration. Keyed to the cross shaft 71 is a normally idle clutch member 82 carrying a dog 83 for releasable engagement with the sloping clutch shoulder 81, the dog being mounted on a pivot 85 and being biased by a suitable spring 86 towards an extended position across the circular path of movement of the clutch shoulder.

Normally the clutch member 82 is in the angular position shown in Fig. 5 with the dog 83 held in its retracted position by an arm 87 of a suitable control or trip means, the arm pressing against a pin 84 that extends laterally from the dog. The arm 87 is part of a bell crank 88 which is biased by a spring 90, the strength of the spring 90 being sufficient to overcome the clutch spring 86. The bell crank 88 is mounted on and keyed to a trip shaft 91, the trip shaft also carrying a trip arm 93. It is apparent that tripping of the trip arm 93 will release the dog 83 for spring-actuated movement into position for engagement by the clutch shoulder 81 thereby to cause the shaft 71 to rotate with the driven clutch member 80. The sloping configuration of the clutch shoulder 81 minimizes the shock of engagement.

Since the clutch shoulder 81 will rotate past the normal position of the clutch dog 83 once while the plunger head 16 is in its upper range of reciprocating movement and once again while the plunger head is at its lower range of movement, and since the tying operation should occur only while the plunger head is at its lower range, we provide means to automatically keep the clutch dog retracted when the plunger head is in its upper range of movement. To this end, as best shown in Fig. 2, we provide a short arm 95 integral with one of the plunger head support arms 31 and connect this small arm by a link 96 with a lever 97 fulcrumed at 98. When the plunger head 16 is at its uppermost position, the lower end of the lever 97 is held against the pin 84 to hold the dog 83 retracted independently of the arm 87 of the trip means. When the plunger head 16 approaches its lower limit position, the lever 97 is swung outwardly to permit the clutch dog to respond to actuation of the trip arm 93.

It is contemplated that the metering means 26 will actuate the described trip means whenever a predetermined quantity of compressed material accumulates within the baling chamber 15. The metering means 26 is in the form of a toothed disc or wheel extending upwardly through a slot in the bottom wall of the baling chamber for engagement by the compressed material moving progressively through the baling chamber. It is contemplated that the metering wheel will act periodically through a second clutch of the over-running type to actuate the trip arm 93.

In our present arrangement, the metering wheel 26 is itself adapted to function as a driving clutch member and is therefore provided with suitable spaced engagement elements or clutch lugs 100. Preferably the lugs are releasably mounted on the metering wheel so that the number and spacing of the lugs may be varied whenever it is desired to vary the length of the finished bales. In the particular construction shown, the individual clutch lugs 100 have threaded portions that extend through suitable holes in the metering wheel and are engaged by retaining nuts 101. The metering wheel 26 is, of course, freely rotatable on the shaft 71.

Adjacent the metering wheel 26 is a clutch member 102 which is also freely rotatable on the shaft 71 and which carries an engagement element or pawl 103 for engagement with the clutch lugs 100. The pawl 103 is mounted for swinging movement on a suitable pivot pin 105 and is urged by a suitable spring (not shown), attached adjacent to the other end of the pawl and positioned between the clutch member 102 and said pawl, into position for engagement with the clutch lugs 100; but, as a result of the position of pawl 103 with its lateral face angularly disposed or inclined to the plane of the metering wheel 26, as shown in Figure 5, pawl 103 rides over the clutch lugs when the clutch member 102 tends to travel faster than the metering wheel. The clutch member 102 has a radial lug 106 for operative contact with the trip arm 93 and also has a lateral lug 107, the lateral lug extending into the path of a reset arm 108 that is keyed to the shaft 71.

Normally the clutch member 102 rests in an inclined position against the trip arm 93 with insufficient pressure to overcome the resistance of the trip mechanism spring 90. The progressive rotation of the metering wheel 26 with progressive movement of material through the baling chamber 15 eventually brings one of the cluth lugs 100 to bear against the end of the pawl 103, whereupon further rotation of the metering wheel acting through the clutch member 102 actuates the trip arm 93 to initiate an operating cycle of the bale-tying mechanism.

If the metering wheel 26 does not move sufficiently at this time to force the clutch member 102 free of the trip arm 93, the reset arm 108 included in the operation of the bale-tying mechanism will immediately contact the lateral lug 107 to force the clutch member free, whereupon the clutch member will gravitate to its lowermost position. The arm 93 may be held in release position by the pressure of the metering wheel 26, while such pressure may not be sufficient to push shoulder 106 beyond the end of arm 93. However, due to the fact that the metering wheel is holding the clutch release mechanism open, the clutch dog 83 is free to engage shoulder 81 and thus start the rotation of shaft 71 at the proper time. When shaft 71 commences to rotate, arm 108 will then free the clutch member. The reset arm 108 soon contacts the lateral lug 107 to continue the rotation of the clutch member 102 upward past center, whereupon the clutch member gravitates to its normal position with the radial lug 106 resting against the trip arm 93. At the end of the bale-tying cycle, the reset arm 108 comes to a stop at the position indicated in Fig. 5.

*Actuation of the moving parts*

From the leading tractor, or other available source of power, a driving shaft 110 leads to a transmission 111 from which extends a lateral shaft 112 in a tubular housing 113, the lateral shaft carrying a sprocket 115 and a suitable flywheel 116. A sprocket chain 117 connects the sprocket 115 with a larger sprocket gear 118 on an upper countershaft 120. Keyed to the countershaft 120 are two pinions 121 for driving the two crank gears 36, respectively, and also keyed to the shaft is a small sprocket 122 that drives a sprocket chain 123 to a sprocket 125. The sprocket 125 is keyed to the previously mentioned cross shaft 32 on which are pivotally mounted the two arms 31 for the plunger head 16, the shaft 32 being free to rotate independently of the arms. Mounted on cross shaft 32 for actuation by the sprocket 125 is a second sprocket 126 from which a sprocket chain 127 leads downward to a sprocket 128 on the crank shaft 66 for actuating the conveying fingers 62. Finally a sprocket chain 130 passes around three sprockets, a sprocket 131 on the crank shaft 66, a sprocket 132 for driving the pickup means 20 and an upper sprocket 133 for driving the upper conveyor means 21.

*Operation*

The operation of the baler may be readily understood from the foregoing description. As the device travels forward, the pick-up means 20 carries the material from the ground upward over the pick-up nose 52 to a point where the material may be engaged by the upper conveyor means 21 for further movement to the accumulation zone on the material-supporting wall 51. Periodically the fingers 62 of the conveyor means 22 shift the accumulated material rearward into the path of the plunger head 16 at the receiving end of the baling chamber 15, the actuating connections being such as to time the rearward movement of the conveying fingers with the upper or retracted movement of the plunger head 16. Periodically the plunger head descends to force increments of the accumulated material into the baling chamber, the cutting blades 45 and 46 severing material that would otherwise tend to bind the plunger head.

The material thus forced into the forward end of the baling chamber is packed into a compact mass that progresses intermittently towards the rear end of the baling chamber and in doing so intermittently advances the metering wheel 26. Periodically the metering wheel initiates a bale-tying cycle in the course of which the needles 23 move upward through suitable slots 135 in the upper and lower walls of the baling chamber and also through the corresponding slots 47 in the plunger head and then retract, the knotter means 25 meanwhile tying the finished bale.

In each of these bale-tying cycles, each of the needles 23 leaves a piece of twine hanging downwardly through the baling chamber with the upper ends of the two twines anchored. The material subsequently forced into the baling chamber moves rearwardly against the two downwardly hanging pieces of twine so that at the beginning of the next tying cycle a quantity of material sufficient for a bale is engaged on three sides by the two pieces of twine. In the initial part of the succeeding tying cycle, the two needles 23 carry the twine upwardly to complete the encirclement of the material and to permit the knotter means to complete the tying operation while the plunger head is substantially at its most advanced position. The completed bales eventually drop out of the rear end of the baling chamber.

Our description in specific detail of a preferred practice of our invention will suggest to those skilled in the art various changes and substitutions under our concept and we reserve the right to all such departures from our disclosure that properly lie within the scope of the appended claims.

We claim:

1. In a baler of the type described, a bale-forming means, a bale-tying mechanism, means including a first normally disengaged clutch to drive said bale-tying mechanism through one cycle of operation, rotatable metering means mounted for rotation about a fixed axis and responsive to movement of material by said bale-forming means, said metering means rotating in one direction only, and means including an overrunning second clutch mounted for rotation about said fixed axis for operatively connecting said metering means with said first clutch for causing engagement of the first clutch.

2. In a baler of the type described, a bale-forming means, a bale-tying mechanism, means including a first normally disengaged clutch to drive said bale-tying mechanism through one cycle of operation, a metering means mounted for rotation about a fixed axis and responsive to movement of material by said bale-forming means, said metering means rotating in one direction only, trip means operatively connected with the first clutch to cause engagement thereof, and means including an overrunning second clutch for operatively connecting said metering means with said trip means for actuation of the trip means, said second clutch being effective at spaced points in the rotation of said metering means, and said trip means and said clutches being also mounted for rotation about said fixed axis.

3. In a baler of the type described, a bale-forming means, a bale-tying mechanism, a metering means mounted for rotation about a fixed axis and responsive to movement of material by said bale-forming means, said metering means rotating in one direction only, a plurality of engagement elements movable with said metering means to constitute a part of an overrunning clutch, a single engagement element mounted for movement relative to said plurality of elements and cooperative therewith to constitute a cooperating part of the overrunning clutch, said single engagement element having a normal set position from which it may be moved by one of said plurality of elements, a normally disengaged clutch to drive said bale-tying mechanism through one cycle of operation, said normally disengaged clutch being also mounted for rotation about said fixed axis and being engageable in response to movement of said single engagement element out of said set position, and automatic means to restore said single engagement element to its set position.

4. In a baler of the type described, a bale-forming means, a bale-tying mechanism, means including a first normally disengaged clutch to drive said bale-tying mechanism through one cycle of operation, a metering means mounted for rotation about a fixed axis and responsive to movement of material by said bale-forming means, said metering means rotating in one direction only, trip means to cause engagement of said clutch, a plurality of engagement elements movable with said metering means to constitute a part of an overrunning clutch, a single engagement element mounted for movement relative to said plurality of elements and cooperative therewith to constitute a cooperating part of the overrunning clutch, said single engagement element being mounted for rotation about said fixed axis and having a normal set position from which it may be moved by one of said plurality of elements for actuation of said trip means, and means to restore said single engagement element to said set position automatically.

5. In a baler of the type described, a bale-forming means, a bale-tying mechanism, means including a first normally disengaged clutch to drive said bale-tying mechanism through one cycle of operation, a metering means mounted for rotation about a fixed axis and responsive to movement of material by said bale-forming means, said metering means rotating in one direction only, and means including an overrunning second clutch for operatively connecting said metering means with said first clutch for causing engagement of the first clutch, said overrunning clutch having a plurality of spaced engagement elements and a single complementary engagement element movable relative to said plurality whereby a predetermined fraction of a rotation of said metering means will cause engagement of the first clutch, said single complementary engagement element being also mounted for rotation about said fixed axis.

6. In a baler of the type described, a bale-forming mechanism, a bale-tying mechanism, a metering means mounted for rotation about a fixed axis and responsive to movement of material by said bale-forming means, said metering means rotating in one direction only, a plurality of engagement elements movable with said metering means to constitute a part of an overrunning clutch, a rotary means carrying a single engagement element to cooperate with said plurality of elements to constitute another part of the overrunning clutch, said rotary means having a normal set position, a normally disengaged clutch to drive said bale-tying mechanism through one cycle of operation, said normally disengaged clutch being mounted for rotation about said fixed axis and being engageable in response to movement of said rotary means out of said set position, and means responsive to engagement of said normally engaged clutch to restore said rotary means to said set position.

7. In a baler of the type described, a bale-forming means, a bale-tying mechanism, means including a first normally disengaged clutch to drive said bale-tying mechanism through one cycle of operation, a rotary metering means mounted for rotation about a fixed axis and responsive to movement of material by said bale-forming means, said metering means rotating in one direction only, trip means to cause engagement of said clutch, a rotatable operating member for actuating said trip means, said operating member being adapted to come to rest adjacent said trip means without actuating the trip means, an overrunning clutch for connecting said metering means with said operating member at at least one point in the rotation of the metering means thereby to actuate said trip means, and means to restore said operating means to its position of rest, said overrunning clutch being mounted for rotation about said fixed axis.

8. In a baler of the type described, a bale-forming means, a bale-tying mechanism, means including a normally disengaged clutch to drive said bale-tying mechanism through one cycle of operation, clutch control means movable by tripping action from an ineffective position to an effective position to cause engagement of said clutch, said control means being biased to its ineffective position, a first rotary means rotating in one direction in response to movement of material by said bale-forming means, a second rotary means co-axial with said first rotary means, said second rotary means having an effective position for tripping said control means, said second rotary means being adapted to seek an ineffective position after tripping the control means, overrunning clutch means effective at selected spaced rotary positions of said first rotary means relative to said second rotary means to operatively interconnect the two rotary means for driving the second rotary means in response to the movement of said material, and means operated through said clutch to rotate said second rotary means from its ineffective position to its effective position in the latter part of said cycle of operation.

9. In a baler of the type described, a bale-forming means, a shaft, a bale-tying mechanism operatively connected to the shaft, driving means including a first normally disengaged clutch mounted on said shaft, said driving means being constructed and arranged to drive said shaft through one revolution, a metering means mounted on the shaft and responsive to movement of material by said bale-forming means, said metering means rotating in one direction only, and means including an overrunning second clutch also mounted on said shaft for operatively connecting said metering means with said first clutch for causing engagement of the first clutch.

10. In a baler as described in claim 9, said metering means including a metering wheel rotatively mounted on said shaft.

11. In a baler of the type described, a bale-forming means, a bale-tying mechanism, means including a first normally disengaged clutch adapted to drive said bale-tying mechanism through one cycle of operation, a metering wheel mounted coaxially with said clutch, said metering wheel being responsive to movement of material by said bale-forming means, said metering wheel rotating in one direction only, and means including an overrunning second clutch for operatively connecting said metering wheel with said first clutch for causing engagement of the first clutch.

WILHELM VUTZ.
LEO H. BRUGGEMAN.

REFERENCES CITED

The following references are of record in the file of this patent:

UNITED STATES PATENTS

| Number | Name | Date |
| --- | --- | --- |
| 367,489 | Wood | Aug. 2, 1887 |
| 526,883 | Wickey | Oct. 2, 1894 |
| 1,027,868 | Madsen | May 28, 1912 |
| 1,205,980 | Dudley | Nov. 28, 1916 |
| 2,349,184 | Martin | May 16, 1944 |
| 2,384,584 | Wildhaber | Sept. 11, 1945 |